Feb. 27, 1968  G. B. HOLCOMBE  3,370,684
INFLATABLE ESCAPE SLIDE
Filed Sept. 8, 1966  2 Sheets-Sheet 1

INVENTOR.
GORDON B. HOLCOMBE
BY Gregg & Stidham
ATTORNEYS

INVENTOR.
GORDON B. HOLCOMBE

BY Gregg & Stidham
ATTORNEYS

United States Patent Office 3,370,684
Patented Feb. 27, 1968

3,370,684
INFLATABLE ESCAPE SLIDE
Gordon B. Holcombe, Millbrae, Calif., assignor to Industrial Covers, Inc., San Francisco, Calif., a corporation of California
Filed Sept. 8, 1966, Ser. No. 577,889
2 Claims. (Cl. 193—25)

ABSTRACT OF THE DISCLOSURE

A double escape slide with inflatable parallel side beams and top, bottom and intermediate inflatable cross beams, all in continuous communication. An intermediate inflatable beam extends above the surface of the slide to divide it into two parallel chutes and to provide greater beam strength.

---

This invention relates to an inflatable escape slide and, more particularly, to a double slide that is adapted to be released and inflated from an aircraft for rapid emergency exit of passengers and the crew.

With the advent of the jet aircraft and the sharp increase in tourist travel, there is a definite trend toward greater and greater passenger loads. At the present time a major aircraft manufacturer is developing and building an aircraft capable of accommodating and transporting 500 passengers, and indications are that even greater payloads will be sought. Even under normal circumstances, the loading and unloading of several hundred passengers will be a monumental task, and in the event of an emergency landing or interruption of take-off wherein it is highly desirable that all personnel aboard leave the aircraft as rapidly as possible, the problems of mass disembarkation are magnified manyfold. By their very nature, emergency evacuations are usaily performed away from normal airport passenger accommodations, and often while the aircraft is disposed in other than its customary landed position. For example, in the event of landing gear failure, the aircraft may be tilted to one side or inclined from its normal disposition with either the forward end or tail section higher than normal.

It is, therefore, an object of this invention to provide an inflatable escape slide that is adapted to provide a means of rapid emergency evacuation of aircraft.

It is a further object of this invention to provide inflatable escape slides having vastly increased escape capacity.

It is a further object of this invention to provide an inflatable escape slide including side restraining means which minimize risk of passenger injury and screens vision by evacuees of ground level immediately below door opening.

It is a further object of this invention to provide an inflatable escape slide that is adapted to produce initial rapid descent but thereafter slows the passenger down to land gently on his feet.

It is still a further object of this invention to provide an escape slide including inflatable longitudinal beams designed for maximum strength with minimum inflation volume requirements.

In carrying out this invention, I provide an escape slide comprising three longitudinal, generally parallel inflatable beams with a flexible sheet of fabric or the like extended between them to form two sliding surfaces, one on each side of the central beam. Top and bottom cross beams or bearing members are in inflatable communication with the longitudinal beams to support the slide at its upper end against the aircraft, and at its lower end on the ground. Since the bending moments of a simple beam under load are at a minimum at its end supports, the diameters of the inflatable beams are tapered down toward their ends in order to minimize inflation capacity, and they are of maximum cross-sections at approximately their mid-points wherein the bending moments are greatest. The lower cross or ground-bearing member is preferably of a diameter that will enable a passenger seated on it to step directly off on to the supporting surface of the ground. Additional inflatable cross members are preferably provided intermediate the ends of the slide for increased rigidity, and along the upper extending, inflatable posts which support side restraining sheets designed to function as side rails and prevent evacuees from falling off, or being frightened at the prospect of falling off, the side of the slide.

Other objects and advantages of this invention will become apparent from the description following when read in conjunction with the accompanying drawings wherein.

Figure 7:
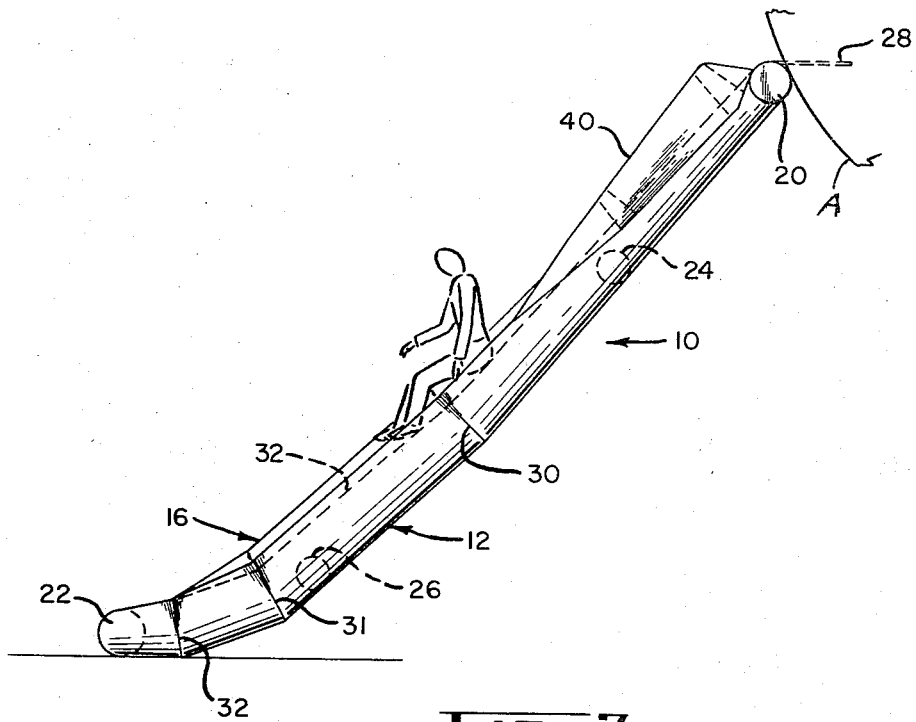
Figure 8:
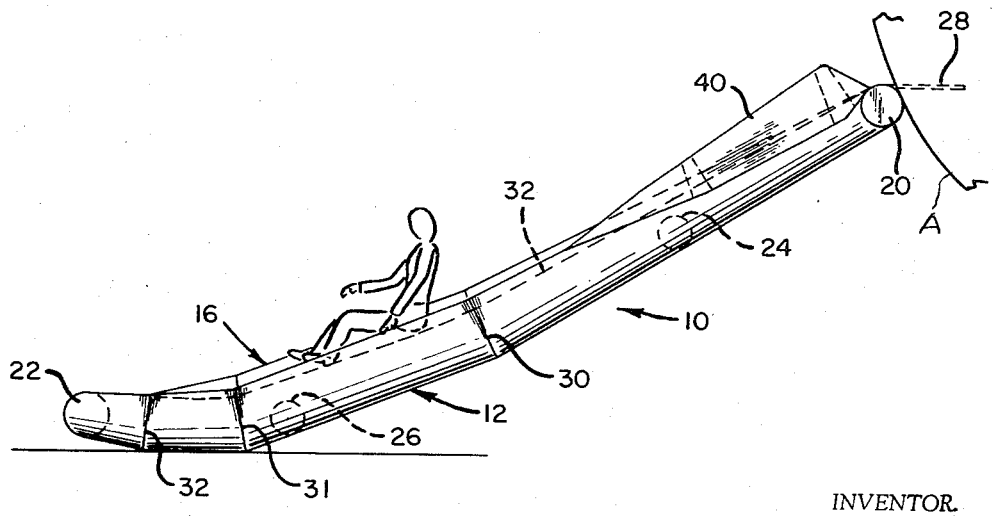

FIGS. 3, 4, 5 and 6 are section views taken along lines 3—3, 4—4, 5—5 and 6—6, respectively; and FIGS. 7 and 8 are side elevation views of the slide in use.

Figure 1:
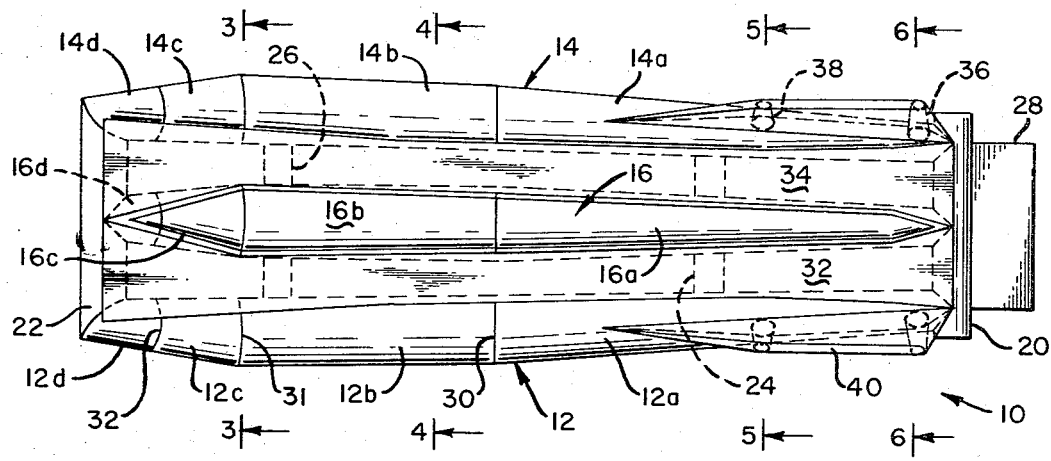
FIG. 1 is a top plan view of an escape slide embodying features of my invention.
Figure 2:
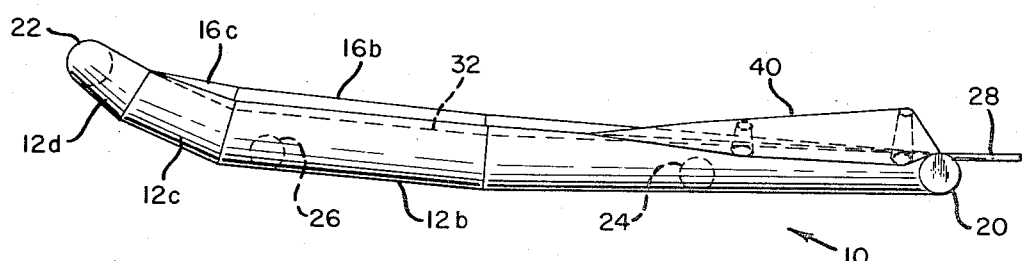
FIG. 2 is a side elevation view of the escape slide.
Figure 3:
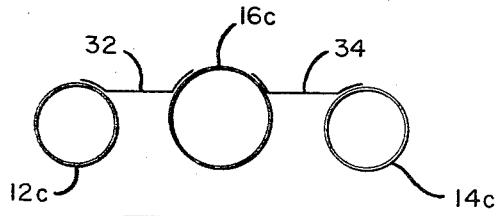
Figure 4:
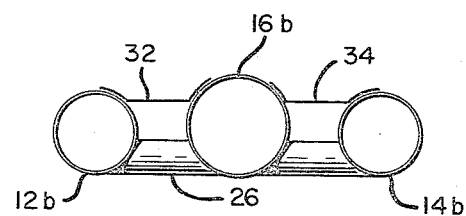
Figure 5:
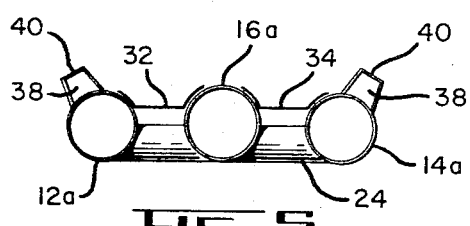
Figure 6:
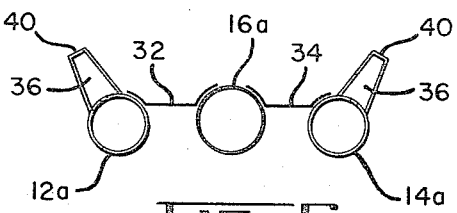

Referring now more particularly to FIG. 1, my high capacity, double escape slide 10 includes a pair of side beams 12 and 14 and a central, intermediate beam 16 all arranged in generally parallel relationship. Interconnecting the upper ends of the beams 12, 14 and 16 and in inflatable communication therewith are upper and lower cross support members 20 and 22, respectively. In addition, intermediate, inflatable transverse members 24 and 26 are provided to interconnect the beams at one or more locations along their length. These intermediate members may be of relatively small diameter since their primary function is not one of load bearing but merely to maintain the separated parallel relationship of the longitudinal beams 12, 14 and 16.

The top cross support member 20 is of extended length, protruding beyond the side beams in order to form a substantial bearing member that, when inflated and secured by the anchor tab 28, bears firmly against the fuselage of the aircraft so as to provide increased stability and insure a straight escape route even in relatively high winds. The diameter of the upper cross support member and the diameters of the beams connecting therewith are relatively small because beam bending moments of the single beam are at a minimum near the beam supports at the aircraft and on the ground, and it is desirable to reduce inflation volume requirements where possible.

It will be noted that the longitudinal beams 12, 14 and 16 are formed in sections a, b, c and d which are joined along seams 30, 31 and 32 to form a series of yieldable hinge-like junctures. As noted in FIGS. 7 and 8, the sections are disposed at progressively smaller angles with respect to the horizon when the escape slide is inflated and supported between the aircraft and the ground. The progressively reduced angles, in and of themselves, tend to reduce the rate of descent from an initial rapid slide at the relatively steep upper sections 12a, 14a and 16a. In addition, the hinge joints 30, 31 and 32 constitute yieldable members which further reduce the slide angle to reduce rate of descent without tending to spring back and produce a trampoline effect.

Preferably, the beam sections are formed of diameters sufficient to resist maximum anticipated loads where needed, but small enough where possible to minimize inflation volume. For that reason, the top sections 12a, 14a and 16a taper outward from their merger with the top cross member 20 to a maximum diameter at the first hinge joint 30 where the angle of descent is reduced slightly.

The second side beam sections 12b, 14b and 16b are of substantially uniform, maximum diameter since through a range of inclination angles dependent upon the height of the upper anchor panel 30, these sections are approximately midway between the beam supports where bending moments are at a maximum. At the hinge joints 31 the third sections extend at still a shallower angle further to reduce the angle of inclination of the slide and increase the braking effects of friction. Finally, the lowermost section 12d, 14d and 16d taper down to the diameter of the bottom cross member 22 which is preferably of a diameter which would enable a person of average height to sit on it with his feet at or near the ground, considering a certain amount of compression.

The actual sliding surfaces 32 and 34 comprise flexible sheet material panels which are bonded or otherwise secured to the longitudinal beams 12, 14 and 16. The sliding surfaces 32 and 34 are preferably disposed slightly below the upper surfaces of the side support beams 12 and 14 so that the beams provide lateral restraining means. In addition, this enables the beams to twist slightly under load, causing the fabric to yield and increase frictional braking. It will also be noted that the intermediate longitudinal beam 16 is of larger diameter over most of its length to divide the slide longitudinally to provide two separate and distinct sliding chutes 32 and 34. Of course, this also accommodates the greater beam loading along the middle of the slide.

Near the upper end of each side support beam 12 and 14 I also provide a pair of posts 36 and 38 which are in open communication with the beams so as to be inflated therewith. The posts 36 and 38, when inflated, support a side wall 40 of fabric or the like which is extended over them and bonded or otherwise secured to the side beams 12 and 14 to provide lateral restraining means, reducing chances of injury by falling.

Referring now to FIGS. 7 and 8, the escape slide is inflated by any conventional means to extend from the fuselage of the aircraft with the anchor panel 28 firmly secured to the aircraft A by any conventional means. Because of the jointed construction, the upper portion of the slide extends downward at a fairly steep angle which is gradually reduced through the second and third sections and finally the lower section is disposed at just a slight angle from the horizontal. In addition, the hinged structure causes the longitudinal support beams to yield under passenger load without producing a trampoline effect, further to brake descent.

Thus, as the passenger progresses down the slide, he drops at maximum speed initially and this is gradually slowed until he reaches the near-horizontal lower section. Then when he reaches the bottom cross member, his weight naturally depresses the fabric slide surface 32 or 34 so that he engages the upper rear quadrant of the tube with the backs of his legs or buttocks to bring him to virtually a complete stop. At this point, the evacuated passenger is seated upon the lower cross member tube 22 and need merely stand up and move away from the slide to complete his escape.

The double slide construction presents a wider escape chute to minimize reluctance to jump. In addition, tests have shown that the escape capacity of the double slide exceeds that of two single slides.

While this invention has been described in connection with a preferred embodiment thereof, it is to be understood that modifications and changes therein may be made by those skilled in the art without departing from the spirit and scope of this invention as defined by the claims appended hereto Having described my invention, I claim:
1. An inflatable escape slide comprising:
   a pair of generally parallel side support beams,
   an intermediate support beam generally parallel to said side support beams,
   an upper and a lower end support member, each joining the adjacent ends of said side support beams, and
   an intermediate support member joining said side support beams intermediate the ends thereof,
   a flexible sheet extending between said beams and support members,
   said side beams and support members being of tubular inflatable construction and being in continuous communication,
   and at least one of said support members being in communication with said intermediate support beam,
   said intermediate support beam extending above the normal level of said flexible sheet to divide said slide into two adjacent chutes.
2. The inflatable escape slide defined by claim 1 including:
   at least one generally upright hollow post carried at the upper end of each side support beam in communication therewith,
   flexible sheet material secured to each side support beam and to said post to form side restraining members.

References Cited

UNITED STATES PATENTS

| | | | |
|---|---|---|---|
| 3,092,232 | 6/1963 | Adams | 193—25 |
| 3,250,361 | 5/1966 | Bystedt | 193—35 |

ANDRES H. NIELSEN, *Primary Examiner.*